Dec. 6, 1949  F. S. EDINGER  2,490,119
GAS CUTTING APPARATUS FOR SERRATING METAL
Filed Aug. 28, 1945
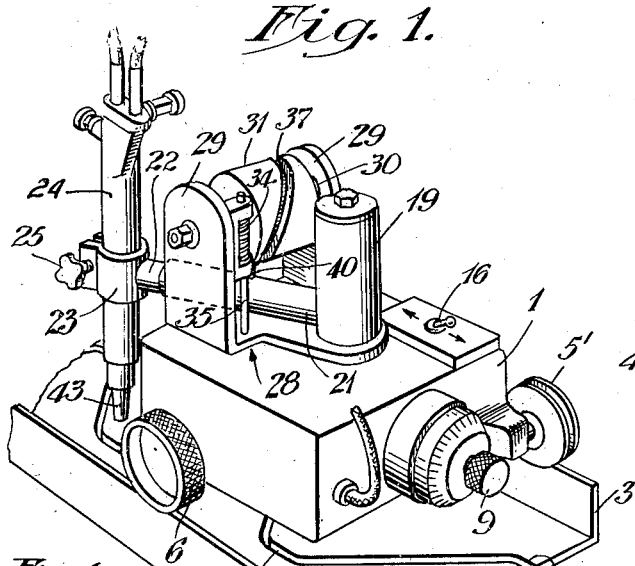
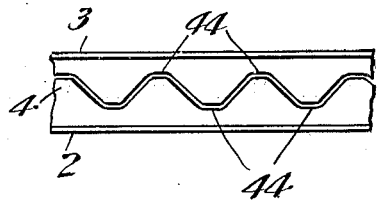
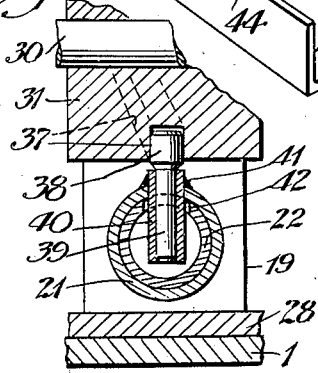
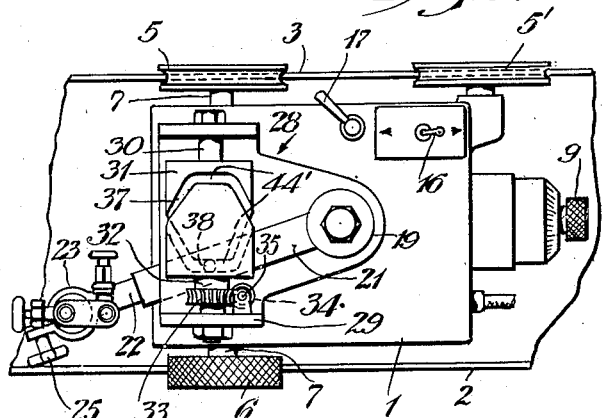
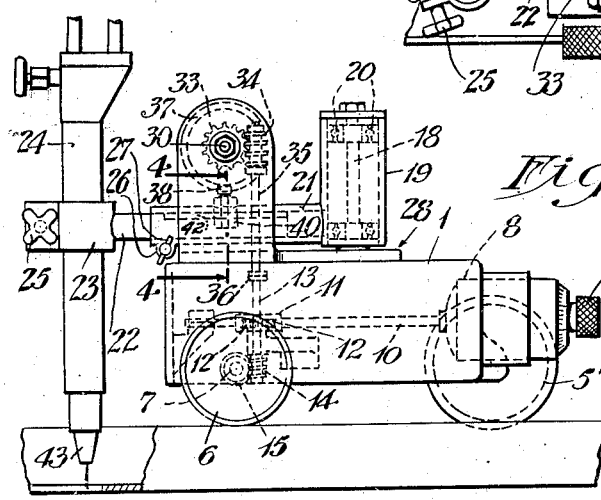
INVENTOR
F. S. Edinger
BY
ATTORNEYS Patented Dec. 6, 1949

2,490,119

UNITED STATES PATENT OFFICE 2,490,119

GAS CUTTING APPARATUS FOR SERRATING METAL

Fred Stanley Edinger, Alameda, Calif., assignor to Air Reduction Company, Incorporated, a corporation of New York Application August 28, 1945, Serial No. 613,103

2 Claims. (Cl. 266—23)

This invention relates to apparatus for cutting metal by means of a gas cutting torch. More particularly, it relates to gas cutting apparatus for cutting metal along a line which gives to the work-piece a serrated margin, or a margin of some similar irregular shape in which a certain configuration is repeated a number of times throughout the length of the cut. It is sometimes desirable to cut the web of a channel beam or an I-beam along an undulating line which will give a serrate shape to the margins of the resulting web portions then left attached to their respective flanges. Metal members similar to those which can be produced in this way are used in shipbuilding and for other purposes.

The principal object of this invention is to provide gas cutting apparatus which, although capable of use in cutting other metal work-pieces along an undulating line to give the margin of the work-piece a serrate or similar shape, is particularly adapted for serrating the webs of channel beams.

The accompanying drawing illustrates gas cutting apparatus which was especially designed for such a use, and this particular embodiment of the invention will be specifically described. In the drawing:

Figure 1 is a perspective view of the apparatus;

Fig. 2 is a plan view of the apparatus shown in Fig. 1;

Fig. 3 is a side elevation of the apparatus shown in Fig. 1;

Fig. 4 is a transverse vertical section taken on the line 4—4 of Fig. 3; and

Fig. 5 is a plan view, on a smaller scale, of a portion of the channel beam showing the type of cut made in the web of the beam by the kind of apparatus illustrated in the other figures.

The apparatus comprises a carriage 1 which, in the particular embodiment of the invention illustrated in the drawing, is adapted to run on the flanges 2 and 3 of a channel beam having a web 4. To adapt the carriage for operation on the beam flanges it is provided at one side with a pair of circumferentially grooved guide wheels 5 and 5' (Fig. 2) and at the opposite side with a wheel 6 having a flat tread which is preferably knurled or roughened. The grooves in the guide wheels 5 and 5' receive the upper edge of the flange 3 and retain the carriage on the beam flanges during the travel of the carriage along the beam, and the flat tread of the wheel 6 runs on the upper edge of the flange 2. The two wheels 5 and 6 are traction wheels and are secured to an axle 7 (Figs. 2 and 3).

The axle 7 is driven by an electric motor 8 (Fig. 3) through a clutch (not shown). The motor has a centrifugal speed governor which may be adjusted by turning a knob 9 at one end of the carriage in a manner well understood in the art. The driving connections from the motor to the axle 7 may be the same as in conventional practice and include a longitudinal shaft 10 (Fig. 3) driven by the motor and having a worm 11 meshing with a worm wheel 12 on a vertical shaft 13 whose lower end carries a worm 14 meshing with a worm wheel 15 that drives the axle through the above-mentioned clutch on the carriage axle. The governor knob 9 is adjusted to cause the motor to propel the carriage along the beam at the desired uniform cutting speed. The motor is reversible and is controlled by an electric switch 16 (Figs. 1 and 2) in one position of which the motor propels the carriage in one direction and in another position of which the motor propels the carriage in the opposite direction. The carriage is also provided with the usual clutch lever 17 (Fig. 2) by means of which the above-mentioned clutch may be operated.

Mounted on top of the carriage there is a vertical post 18 (Fig. 3). A vertical sleeve 19 fits over the post and is adapted to swivel freely thereon. Preferably, ball bearings 20 (Fig. 3) are interposed between the post and the sleeve. A tubular torch arm 21 is brazed or welded to the sleeve 19 and extends toward the torch end of the carriage. A tubular torch arm extension 22 is secured to a torch holder 23 and is adapted to telescope into the tubular torch arm 21. A gas cutting torch 24, such as oxyacetylene cutting torch, is clamped in a vertical position in the holder 23. The holder 23 is of the split-sleeve type, and after the torch has been given its proper vertical adjustment in the holder it may be clamped therein by turning the usual knob 25. There is also a split-sleeve type of clamp 26 at the end of the tubular torch arm 21. The torch arm extension 22 may be adjusted in the tubular torch arm 21 to adjust the distance from the torch axis to the axis of the post 18 after which a thumb-nut 27 may be turned to clamp the torch arm extension in the split-sleeve at the end of the torch arm.

Mounted on top of the carriage there is a frame 28 (Fig. 1) having a pair of laterally spaced standards 29 between which the torch arm 21 projects. A horizontal cam shaft 30 (Fig. 2) spans the gap between the standards 29 and is fixedly secured to them at its opposite ends. A cam cylinder 31 is mounted to turn freely on the shaft 30. Preferably, the cylinder is rotatably mounted on the shaft by means of ball bearings (not shown). The cam cylinder at one of its ends has an integral boss 32 (Fig. 2) to which there is rigidly secured a worm wheel 33. This worm wheel meshes with a worm 34 secured to the upper end of a vertical shaft 35, the lower end of which extends into the carriage and is coupled to the above-mentioned vertical shaft 13 by a coupling 36 (Fig. 3). The cam cylinder 31 has a cam groove 37 in which a cam follower 38 operates. As best shown in Fig. 4 the cam follower has a head portion 38 which operates in the cam groove and a stem portion 39 which fits in a sleeve 40. This sleeve extends downwardly into the interior of the tubular torch arm 21 through an opening in its upper wall and is brazed or welded to the torch arm as indicated at 41. The torch arm extension 22 has a longitudinal slot 42 through which the sleeve 40 extends and which permits longitudinal adjustment of the torch arm extension without interference by the sleeve.

It will now be seen that the motor 8 which operates the torch carriage also rotates the cam cylinder 31 about the axis of its shaft 30. The cam groove in the cam cylinder is so shaped that during movement of the carriage along the beam it swings the torch arm 21 and its extension 22 continually back and forth about the axis of the vertical post 18 so that the tip of the torch, shown at 43 (Figs. 1 and 3) has a transverse component of movement back and forth across the beam. The longitudinal movement of the torch produced by the movement of the carriage lengthwise of the beam, combined with its transverse movement produced by the cam 31, causes the torch to cut the web 4 of the beam along a line which serrates the web, i. e. it produces serrations along the margins of the web portions left attached to their respective flange 2 and 3 as shown in Figs. 1 and 5. In the type of cut shown in the drawings each serration has a flat tip or crest produced by a portion 44 of the cut which is parallel to the longitudinal axis of the beam. These portions of the cut are produced when the cam follower is engaged by the longitudinal portions 44' of the cam groove (Fig. 2) which impart no transverse movement to the torch. However, the cam groove may be so shaped as to give each serration any desired shape.

Since the cam cylinder 31 is driven from the same motor that operates the torch carriage, a proper correlation of the longitudinal and transverse components of the torch motion is insured. The actual lineal speed of the torch does not of course remain constant because the speed of the torch carriage is constant and the torch therefore moves at a higher lineal speed during the time that it has both longitudinal and transverse movement. However, if the pressures of the gases delivered to the torch are adjusted so that the torch will cut satisfactorily when moving at its fastest speed, the variation in the lineal speed of the torch is not a disadvantage except to the extent that when the torch is moving at less than its maximum lineal speed it does not operate at maximum efficiency.

The amplitude of the transverse movement of the torch can be changed, without changing the cam, by adjusting the torch arm extension 22 in the torch arm 21 to thereby change the distance of the torch from the axis of the vertical post 18 about which the torch arm and its extension swing.

The apparatus may be used for making a cut of a different shape by replacing the cam with another cam having a slot of different and appropriate contour. For example, by employing a suitably grooved cam a cut may be made having the shape of a sine curve.

While the apparatus shown in the drawing was designed especially for serrating the webs of channel beams, the invention is not limited to that particular use. It may be used, for instance, to serrate a plate or other flat work-piece by operating the carriage on a track positioned on the flat work-piece.

I claim:
1. Apparatus for serrating metal work-pieces comprising a wheeled torch carriage adapted to travel over the work-pieces, a vertical pivot post mounted on said carriage, a torch-supporting arm connected at one of its ends to the vertical pivot post for pivotal movement thereabout in a horizontal plane, a gas cutting torch mounted at the distal end of the supporting arm and having the tip thereof directed downwardly, a cam carried by said carriage, means co-operating with the cam and the torch supporting arm for moving the supporting arm and the torch mounted thereon horizontally over a work-piece and transversely of the direction of movement of the carriage, driving means for rotating the cam and propelling the carriage at coordinated speeds to produce coordinated longitudinal and transverse components of movement of the torch with respect to the direction of movement of the carriage so that as the carriage moves over a work-piece the torch will cut a serrated kerf in the work-piece which continually progresses in the direction of movement of the carriage.

2. Apparatus for serrating metal work-pieces comprising a wheeled torch carriage adapted to travel over the work-pieces, a vertical pivot post mounted on said carriage, a torch-supporting arm connected at one of its ends to the vertical pivot post for pivotal movement thereabout in a horizontal plane, a gas cutting torch mounted at the distal end of the supporting arm and having the tip thereof directed downwardly, a bracket mounted on the carriage having a pair of laterally spaced standards, a cam cylinder having a peripheral cam groove supported by said standards and rotatable about a horizontal axis, the torch arm extending through the space under the cam cylinder and between the standards and projecting beyond one end of the carriage, a cam follower on the torch arm operable in the cam groove to swing the torch arm back and forth to impart reciprocation of the torch transversely of the direction of movement of the carriage, driving means for rotating the cam and propelling the carriage at coordinated speeds to produce coordinated longitudinal and transverse components of movement of the torch with respect to the direction of movement of said carriage, so that as the carriage moves over a work-piece the torch will cut a serrated kerf in the work-piece which continually progresses in the direction of movement of the carriage.

FRED STANLEY EDINGER.

REFERENCES CITED

The following references are of record in the file of this patent:

UNITED STATES PATENTS

| Number | Name | Date |
|---|---|---|
| 963,638 | Packer | July 5, 1910 |
| 1,029,389 | Metzger | June 11, 1912 |
| 1,728,972 | Krebs | Sept. 24, 1929 |
| 2,142,436 | Clabeaux | Jan. 3, 1939 |
| 2,182,707 | Shipman | Dec. 5, 1939 |
| 2,305,909 | Stoneberg | Dec. 22, 1942 |

FOREIGN PATENTS

| Number | Country | Date |
|---|---|---|
| 563,256 | Great Britain | Aug. 4, 1944 |